US011549671B1

(12) United States Patent
Tang

(10) Patent No.: US 11,549,671 B1
(45) Date of Patent: Jan. 10, 2023

(54) PAN-TILT STRUCTURE AND LIGHTING DEVICE

(71) Applicant: Aputure Imaging Industries Co., Ltd., Shenzhen (CN)

(72) Inventor: Rong Tang, Shenzhen (CN)

(73) Assignee: APUTURE IMAGING INDUSTRIES CO., LTD., Shenzhen (CN)

( * ) Notice: Subject to any disclaimer, the term of this patent is extended or adjusted under 35 U.S.C. 154(b) by 0 days.

(21) Appl. No.: 17/541,972

(22) Filed: Dec. 3, 2021

(30) Foreign Application Priority Data

Sep. 13, 2021 (CN) .......................... 202111066028.1

(51) Int. Cl.
*F21V 21/29* (2006.01)
*F16M 11/14* (2006.01)
*F21V 21/15* (2006.01)

(52) U.S. Cl.
CPC ............. *F21V 21/15* (2013.01); *F16M 11/14* (2013.01); *F21V 21/29* (2013.01); *F16M 2200/022* (2013.01)

(58) Field of Classification Search
CPC ... F21V 21/29; F16C 11/06–086; F16M 11/14
USPC ........................................................ 362/421
See application file for complete search history.

(56) References Cited

U.S. PATENT DOCUMENTS

| | | | |
|---|---|---|---|
| 2007/0151387 A1 | 7/2007 | Vogt | |
| 2008/0121767 A1 | 5/2008 | Wimberley | |
| 2009/0027900 A1* | 1/2009 | Janos | F21V 21/30 |
| | | | 362/373 |

FOREIGN PATENT DOCUMENTS

| | | |
|---|---|---|
| CN | 201672221 U | 12/2010 |
| CN | 103470926 A | 12/2013 |
| CN | 104089160 A | 10/2014 |
| CN | 212480651 U | 2/2021 |
| DE | 102013004952 A1 | 3/2014 |
| EP | 1788299 A1 | 5/2007 |
| EP | 3798725 A1 | 3/2021 |

\* cited by examiner

*Primary Examiner* — Sean P Gramling
(74) *Attorney, Agent, or Firm* — Alston & Bird LLP

(57) ABSTRACT

The present application disclosed a pan-tilt structure and a lighting device, and the pan-tilt structure includes a base, a ball, a ball sleeve, and a locking mechanism, a side of the base is provided with a support surface; the ball is arranged on the support surface; the ball sleeve includes a locking member connected to the base, the locking member is arranged around the ball, and the locking member is provided with a first locking portion and a second locking portion that are arranged in an extending direction along the locking member, and an adjustment gap is provided between the first locking portion and the second locking portion and configured for disconnecting the locking member; an adjustment assembly of the locking mechanism is connected to the first locking portion and the second locking portion.

20 Claims, 8 Drawing Sheets

PAN-TILT STRUCTURE AND LIGHTING DEVICE

CROSS-REFERENCE TO RELATED APPLICATION

The present application claims priority to and the benefit of Chinese Patent Application No. 202111066028.1, filed on Sep. 13, 2021; the content of which as are hereby incorporated by reference herein in their entirety.

BACKGROUND

Technical Field

The present application relates to the field of lighting technology, and more particularly to a pan-tilt structure and a lighting device.

Related Art

In the process of film and television dramas, advertisements, and video creation, lighting devices are often required for lighting. However, based on the different use scenes, it is necessary to stably place the lamps of the lighting devices in different positions and different angles. Therefore, during the use of the lighting devices, the pan-tilt structure for supporting and locking the lamps is particularly important.

In the prior art, a U-shaped bracket can be used to support and fix the lamps, and a principle similar to a brake disc is usually used on the U-shaped bracket to realize the rotation and fixation of the lamps. For example, a side of a rotating block is provided with the U-shaped bracket, a disc for connecting the rotating block, and a brake U disc for clamping and fixing the disc, the brake U disc clamps the disc through the rotation of the external handle, so that the rotating block and the disc can be fixed, and the lamps are fixed on the bracket, when the handle is turned such that the brake U disc no longer clamps the disc, the rotating block can be rotated to realize the tilt angle adjustment of the lamps.

However, with the increase in scene demand, the above brackets cannot meet the more dimensional angle adjustments of the lamps (such as left and right, front and rear, etc.). On the other hand, the power of the lamps continues to increase, and the volume and weight also increase, and when the user turns the handle to adjust the lamps, the user often needs to consume a lot of physical strength, and it is easy to cause unstable fixation.

BRIEF SUMMARY

Embodiments of the present application provide a pan-tilt structure and a lighting device, in order to solve the problems of inefficient adjustment or fixation of existing devices (such as lamps, etc.), as well as inconvenient fixation and instability.

An embodiment of the present application provides a pan-tilt structure, and the pan-tilt structure includes:

a base, a side of the base is provided with a support surface;

a ball, arranged on the support surface;

a ball sleeve, including a locking member connected to the base, the locking member is arranged around the ball, and the locking member is provided with a first locking portion and a second locking portion that are arranged in an extending direction along the locking member, and an adjustment gap is provided between the first locking portion and the second locking portion and configured for disconnecting the locking member; and a locking mechanism, including an adjustment assembly, a transmission assembly, and a driving member; the adjustment assembly is connected to the first locking portion and the second locking portion, the driving member is connected to the adjustment assembly through the transmission assembly, to drive the adjustment assembly adjusting a distance between the first locking portion and the second locking portion, and a transmission ratio of the transmission assembly is greater than 1.

Optionally, the adjustment assembly includes an adjustment rod, and the adjustment rod is provided with a threaded connection portion and an abutment portion, the threaded connection portion is threadedly connected to the first locking portion, and the abutment portion abuts against a side of the second locking portion away from the first locking portion; and the transmission assembly includes a first transmission wheel arranged on the adjustment rod, and a second transmission wheel connected with the driving member; the second transmission wheel is in transmission connection with the first transmission wheel, and a transmission ratio of the second transmission wheel to the first transmission wheel is greater than 1.

Optionally, the first transmission wheel is a first gear, the second transmission wheel is a second gear configured to be meshed with the first gear, and an index circle diameter of the first gear is larger than an index circle diameter of the second gear.

Optionally, the second gear is located on a side of the second locking portion away from the first locking portion; the abutment portion is located on a side of the second gear facing the second locking portion; and a first gasket is further provided between the abutment portion and the second locking portion; and the second gear is rotatably connected with the second locking portion; the second gear is located on a side of the second locking portion away from the first locking portion, and a second gasket (186) is provided between the second gear and the second locking portion.

Optionally, the second locking portion is provided with a first bearing, and the first bearing is sleeved on the adjustment rod such that the adjustment rod is rotatably connected with the second locking portion; the adjustment assembly includes a locking nut, the locking nut is arranged on the first lock portion, and the locking nut is threadedly connected to the threaded connection portion such that the first lock portion is threadedly connected with the threaded connection portion; and the second locking portion is provided with a second bearing, the second transmission wheel includes a rotating shaft connected with the second gear, and the second bearing is sleeved on the rotating shaft such that the second transmission wheel is rotatably connected with the second locking portion.

Optionally, the pan-tilt structure further includes a protective cover; the protective cover is covered at a side of the second locking portion away from the first locking portion, the protective cover is provided with a receiving cavity, the first transmission wheel and the second transmission wheel are located in the receiving cavity;

the protective cover is provided with a third bearing, and the third bearing is sleeved on the adjustment rod such that the third bearing is rotatably connected with the protective cover;

the protective cover is provided with a fourth bearing, and the fourth bearing is sleeved on the rotating shaft such that the rotating shaft is rotatably connected with the protective cover; and the driving member includes a handle; an end of the rotating shaft passes through the protective cover and is connected to an end of the handle.

Optionally, a deformation gap is provided between the locking member and the base, the deformation gap is extended along a circumferential direction of the locking member, and deformation gap is in communication with the adjustment gap.

Optionally, a sum of an arcs of the deformation gap in the circumferential direction of the locking member is greater than or equal to 120°; and the sum of the arcs of the deformation gap in the circumferential direction of the locking member is less than or equal to 140°.

Optionally, the locking member includes a first deformable section, a connection section and a second deformation section connected in sequence along the circumferential direction of the locking member, the first locking portion is located at an end of the first deformation section away from the connection section, and the second locking portion is located at an end of the second deformation section away from the connection section; and the base includes a bottom plate, and a support portion protruding from a side surface of the bottom plate, and the support surface is located at the support portion away from the bottom plate; the ball sleeve includes a connection ring located on a side of the locking member facing the base, and the connection ring is sleeved on the supporting portion; the connection section is connected to the connection ring, and the deformation gap includes a first gap located between the first deforming section and the connection ring between, and a second gap located between the second deformation section and the connection ring.

Optionally, a connection rod is connected to the ball, the connection suction is penetratingly provided with an accommodating groove, the accommodating groove extends along the locking member in a direction away from the connection ring, and the accommodating groove is formed with an opening on a side of the locking member away from the connection ring; the opening is arranged in a flared shape; an outer surface of the connection section is provided with an escape slope at the opening.

Optionally, a first friction sheet is provided between the support surface and the ball, and a first side surface of the first friction sheet facing the ball is provided with a concave spherical surface configured for fitting with a surface of the ball; a second friction sheet is provided between the locking member and the ball, the second friction sheet is arranged around the ball, and a second side surface of the second friction sheet facing the ball is provided with a concave spherical surface configured for fitting with a surface of the ball.

Optionally, the first locking portion and the second locking portion are convexly provided on an outer surface of the locking member away from an outer surface of the ball; an outer surface of the locking member close to an edge of the second locking portion is provided with an escape groove, and the escape groove extends along an axial direction of the locking member, and a side edge of the protective cover facing the locking member is located in the escape groove.

Optionally, the transmission ratio of the transmission assembly is greater than or equal to 1.5; and the transmission ratio of the transmission assembly is less than or equal to 5.

The present application further provides a lighting device, the lighting device includes:

a lamp;

a bracket, connected to the lamp;

a pan-tilt structure, the pan-tilt structure is the pan-tilt structure above mentioned, the pan-tilt structure includes:

a base, a side of the base is provided with a support surface;

a ball, arranged on the support surface;

a ball sleeve, including a locking member connected to the base, the locking member is arranged around the ball, and the locking member is provided with a first locking portion and a second locking portion that are arranged in an extending direction along the locking member, and an adjustment gap is provided between the first locking portion and the second locking portion and configured for disconnecting the locking member; and a locking mechanism, including an adjustment assembly, a transmission assembly, and a driving member; the adjustment assembly is connected to the first locking portion and the second locking portion, the driving member is connected to the adjustment assembly through the transmission assembly, to drive the adjustment assembly adjusting a distance between the first locking portion and the second locking portion, and a transmission ratio of the transmission assembly is greater than 1.

In the pan-tilt structure provided by the embodiment of the present application, the transmission ratio of the transmission assembly of the locking mechanism is disposed greater than 1. That is, the transmission ratio of the input end to the output end of the transmission assembly is greater than 1. Therefore, the torque at the input end of the transmission assembly is greater than the torque at the output end of the transmission assembly. When the driving member drives the adjustment assembly to adjust the distance between the first locking portion and the second locking portion through the transmission assembly, the driving member can input a smaller force at the input end of the transmission assembly to drive the locking assembly to adjust the distance between the first locking portion and the second locking portion through the transmission assembly, the problems that the existing pan-tilt structure needs to consume a lot of force when unlocking or locking the ball are solved.

BRIEF DESCRIPTION OF THE DRAWINGS

The technical solutions and other beneficial effects of the present application will be made obvious by describing the specific implementation manners of the present application in detail below in conjunction with the accompanying drawings.

Figure 1:
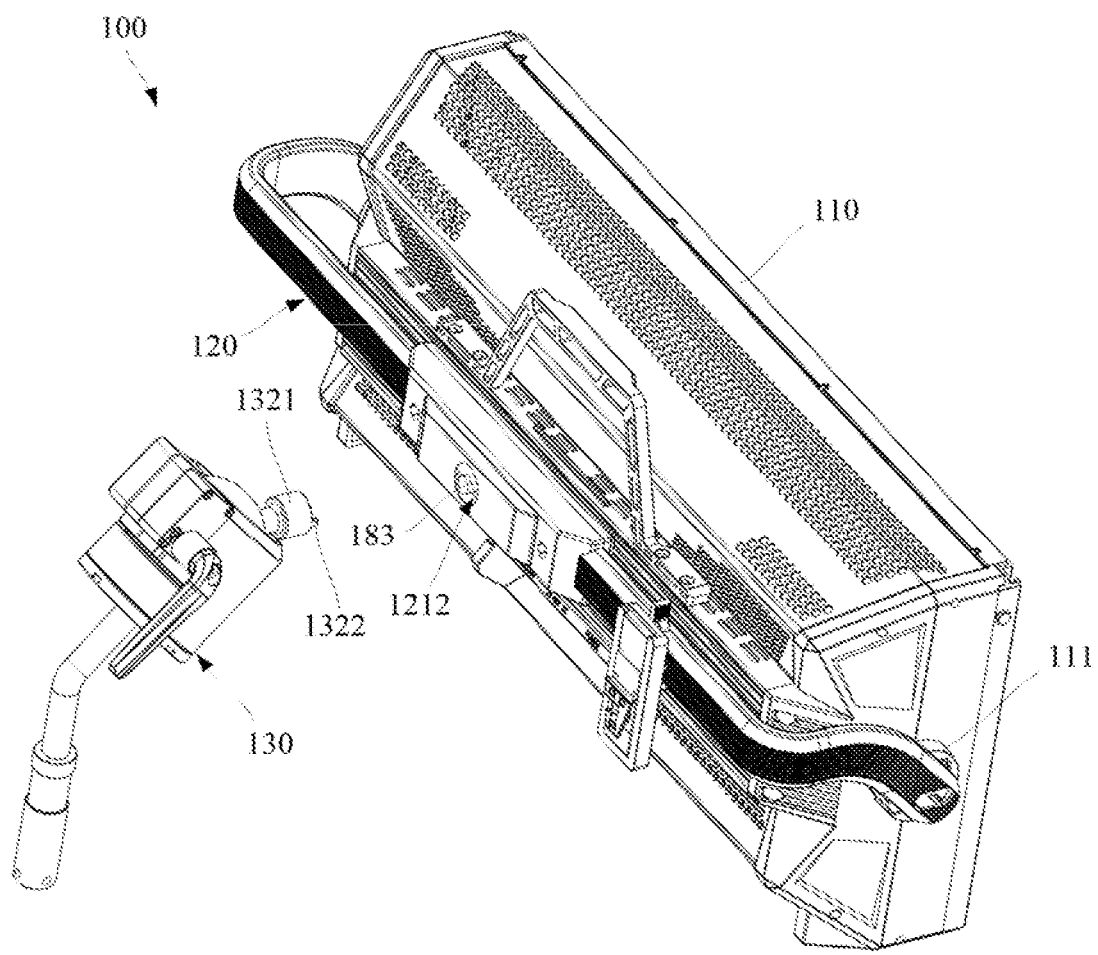
FIG. 1 is a schematic view of an exploded structure of an embodiment of a lighting device provided by an embodiment of the present application.

100—lighting device; 110—lamp; 111—support member; 1111—connection groove; 1112—notch; 1113—eighth fixing hole; 120—bracket; 121—first support rod; 1211—sixth fixing hole; 1212—limiting groove; 122—second support rod; 123—connection block; 1231—seventh fixing hole; 130—pan-tilt structure; 131—base; 1311—bottom plate; 1312—support portion; 1313—support surface; 1314—first recess; 1315—second fixing hole; 1316—third fixing hole; 132—ball; 1321—connection rod; 1322—limiting protrusion; 1323—fifth fixing hole; 140—ball sleeve; 141—locking member; 1410—first locking portion; 1411—mounting groove; 1412—second locking portion; 1413—adjustment gap; 1414—deformation gap; 1415—first gap; 1416—second gap; 1417—first deformation section; 1418—connection suction; 14181—accommodating groove; 14182—opening; 14183—escape slope; 1419—second deformation section; 1420—second recess; 1421—escape groove; 143—connection ring; 1431—fourth fixing hole; 150—locking mechanism; 151—adjustment assembly; 1511—adjustment rod; 1512—threaded connection portion; 1513—abutment portion; 1514—locking nut; 152—transmission assembly; 1521—first transmission wheel; 1522—second transmission wheel; 1523—rotating shaft; 153—driving member; 1531—first mounting hole; 1532—internal gear; 1533—through hole; 1534—second mounting hole; 154—fixing member; 1541—rotating portion; 1542—external gear; 1543—connection hole; 155—limiting member; 1551—limiting portion; 156—elastic member; 160—protective cover; 161—receiving cavity; 162—third bearing; 163—fourth bearing; 164—through hole; 170—support rod; 171—first fixing hole; 181—first fastener; 182—second fastener; 183—third fastener; 185—first gasket; 186—second gasket; 187—first friction sheet; 1871—first side surface; 188—second friction sheet; 1881—second side surface; 1882—escape notch; 189—first bearing; 190—second bearing.

DETAILED DESCRIPTION OF VARIOUS EMBODIMENTS

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in the present application, all other embodiments obtained by those skilled in the art without creative work shall fall within the protection scope of the present application.

In the description of the present application, it should be understood that the terms "center", "longitudinal", "transverse", "length", "width", "thickness", "upper", "lower", "front", "back", "left", "right", "vertical", "horizontal", "top", "bottom", "inner", "outer", "clockwise", "counterclockwise" and other directions or the positional relationship is based on the position or positional relationship shown in the drawings, and is only for the convenience of describing the application and simplifying the description, and does not indicate or imply that the pointed device or element must have a specific orientation, be constructed and operated in a specific orientation, Therefore, it cannot be understood as a restriction on the present application. In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include one or more of the features. In the description of the present application, "multiple" means two or more than two, unless otherwise specifically defined.

In the description of the present application, it should be noted that the terms "mounting", "connecting", and "connected" should be understood in a broad sense, unless otherwise clearly specified and limited. For example, it can be a fixedly connected or a detachably connected or integrally connected; it can be mechanically connected, or it can be electrically connected or can communicate with each other; it can be directly connected, or indirectly connected through an intermediate medium, it can be the internal communication of two components or the interaction of two components relation. For those skilled in the art, the specific meanings of the above-mentioned terms in the present application can be understood according to specific circumstances.

In the present application, unless expressly stipulated and defined otherwise, the "above" or "below" of the first feature of the second feature may include direct contact between the first and second features, or may include the first and second features not in direct contact but through other features between them. Moreover, the first feature being "above" the second feature includes the first feature being directly above and obliquely above the second feature, or it simply means that the level of the first feature is higher than that of the second feature. The first feature being "below" the first feature includes the first feature directly below and obliquely below the second feature, or it simply means that the level of the first feature is smaller than the second feature.

The following disclosure provides many different embodiments or examples for realizing different structures of the present application. In order to simplify the disclosure of the present application, the components and settings of specific examples are described below. Of course, they are only examples, and are not intended to limit the present application. In addition, the present application may repeat reference numerals and/or reference letters in different examples. Such repetition is for the purpose of simplification and clarity, and does not indicate the relationship between the various embodiments and/or settings discussed. In addition, the present application provides examples of various specific processes and materials, but those skilled in the art may be aware of the application of other processes and/or the use of other materials.

The embodiments of the present application provide a pan-tilt structure and a lighting device. Detailed descriptions are given below.

First, the embodiment of the present application provides a pan-tilt structure. It should be understood that the pan-tilt structure of the present application can be used not only on lamps, but also on other apparatuses that requires fixed support, such as cameras and optical accessories.

FIG. 1 is a schematic view of an exploded structure of an embodiment of a lighting device provided in an embodiment of the present application. As shown in FIG. 1, the lighting device 100 includes a lamp 110, a bracket 120, and a pan-tilt structure 130, and the lamp 110 is used to emit light. The bracket 120 is connected with the lamp 110 to support the lamp 110. The pan-tilt structure 130 is connected to the bracket 120 to support the bracket 120. Among them, the pan-tilt structure 130 can adjust the position and angle of the bracket 120, and then adjust the position and angle of the lamp 110.

As shown in FIGS. 3 to 6, the pan-tilt structure 130 includes a base 131, a ball 132, a ball sleeve 140, and a locking mechanism 150. One side of the base 131 is provided with a support surface 1313. The support surface 1313 may be a curved surface. The ball 132 is arranged on the support surface 1313 of the base 131, and the ball 132 is connected to the bracket 120 of the lighting device 100. The ball sleeve 140 includes a locking member 141 connected to the base 131, and the locking member 141 is arranged around the ball 132. The locking mechanism 150 is connected with the locking member 141 to adjust the tightness of the locking member 141 so that the locking member 141 can lock the ball 132, or the locking member 141 can unlock the ball 132.

A connection rod 1321 is connected to the ball 132, and the connection rod 1321 is connected to the bracket 120, so that the bracket 120 is connected to the pan-tilt structure 130. When the locking mechanism 150 causes the locking member 141 to lock the ball 132, it can be understood that the locking member 141 and the ball 132 may be in surface contact in the radial direction relative to the ball 132, and the surface contact of the locking member 141 presses the ball 132 in the direction of the support surface 1313, so that the ball 132 cannot rotate relative to the ball sleeve 140 and the base 131, so that the angle and position of the connection rod 1321 and the lamp 110 connected to the connection rod 1321 through the bracket 120 are kept stable. When the locking mechanism 150 causes the locking member 141 to release the ball 132, the ball 132 can rotate relative to the ball sleeve 140 and the base 131, so that the angle and position of the connection rod 1321 can be adjusted, and the angle and position of the lamp 110 can be adjusted.

Among them, the locking member 141 is successively provided with a first locking portion 1410 and a second locking portion 1412 along the extending direction of the locking member 141, and an adjustment gap 1413 is provided between the first locking portion 1410 and the second locking portion 1412 to disconnect the locking member 141. The locking mechanism 150 is connected with the first locking portion 1410 and the second locking portion 1412 to adjust the distance between the first locking portion 1410 and the second locking portion 1412, thereby adjusting the tightness of the locking member 141 to the ball 132.

Optionally, the locking mechanism 150 includes an adjustment assembly 151, a transmission assembly 152, and a driving member 153. The adjustment assembly 151 is connected to the first locking portion 1410 and the second locking portion 1412, and the driving member 153 is connected to the adjustment assembly 151 through the transmission assembly 152 to drive the adjustment assembly 151 adjusting the distance between the first locking portion 1410 and the second locking portion 1412, thereby changing the width of the adjustment gap 1413, so that the inner wall of the locking member 141 and the ball 132 have a different surface contact, thereby adjusting the tightness of the locking member 141, and the transmission assembly 152 of the locking mechanism 150 has a transmission ratio greater than 1.

It is understandable that the pan-tilt structure of the present application is to support heavy objects, for example 40-60 kg. Therefore, the volume of the locking member 141 and the ball 132 is relatively larger, so the operation of locking the ball 132 needs a larger force more than before, if following the existing pan-tilt designs, which often requires a lot of effort to lock the ball, and the unstable fixation causing by unlocking may happen sometimes. Therefore, the transmission ratio of the transmission assembly 152 of the locking mechanism 150 is arranged to be greater than 1, that is, the transmission ratio of the input end to the output end of the transmission assembly 152 is greater than 1. Therefore, the torque at the input end of the transmission assembly 152 is greater than the torque at the output end of the transmission assembly 152. When the driving member 153 drives the adjustment assembly 151 through the transmission assembly 152 to adjust the distance between the first locking portion 1410 and the second locking portion 1412, the driving member 153 can drive the locking assembly through the transmission assembly 152 to adjust the distance between the first locking portion 1410 and the second locking portion 1412 by inputting a smaller force at the input end of the transmission assembly 152, the length and size of the driving member 153 is effectively reduced, and the operating efficiency of locking and unlocking of the user is improved.

In some embodiments, the driving member 153 includes a handle that is connected to the transmission assembly 152. After the user applies an external force to the handle to move the handle, the transmission assembly 152 can drive the locking assembly to adjust the distance between the first locking portion 1410 and the second locking portion 1412. Of course, the driving member 153 may also be a motor or other power mechanism.

In some embodiments, the transmission ratio of the transmission assembly 152 is greater than or equal to 1.5, so that the locking mechanism 150 has a better labor saving effect.

In addition, the transmission ratio of transmission assembly 152 is less than or equal to 5. It can be understood that when the distance between the first locking portion 1410 and the second locking portion 1412 is adjusted by the locking assembly to be the same, the greater the transmission ratio of the transmission assembly 152, the greater the distance the driving member 153 needs to move. In the embodiment of the present application, the transmission ratio of the transmission assembly 152 is less than or equal to 5, so that the driving member 153 can drive the adjustment assembly 151 through the transmission assembly 152 with a smaller force to adjust the distance between the first locking portion 1410 and the second locking portion 1412, so that the driving distance of the driving member 153 is smaller.

Figure 5:
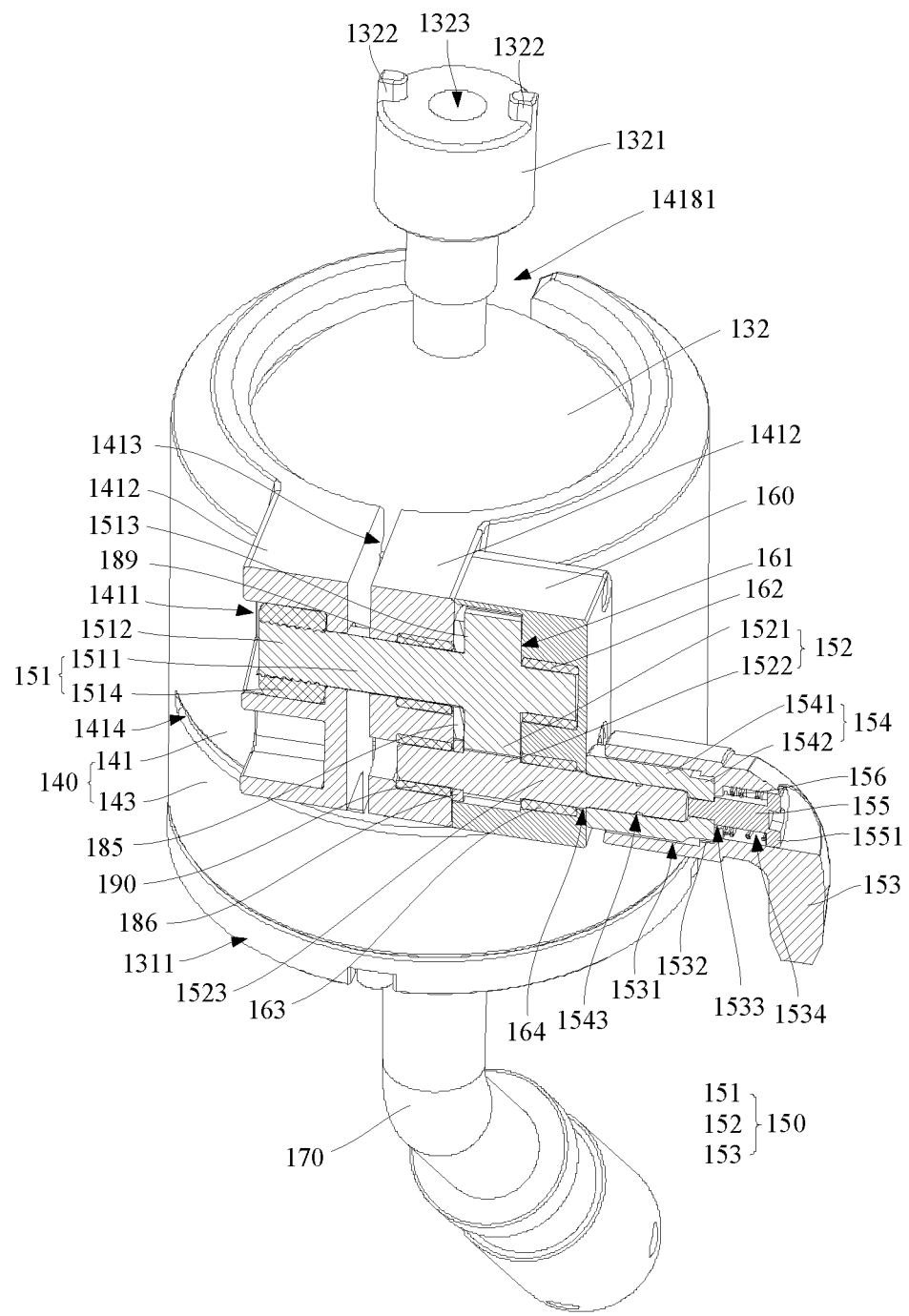
FIG. 5 is a first cross-sectional view of a pan-tilt structure provided by an embodiment of the present application, which is a cross-sectional view along an axial direction of an adjustment rod and a rotating shaft.
Figure 7:
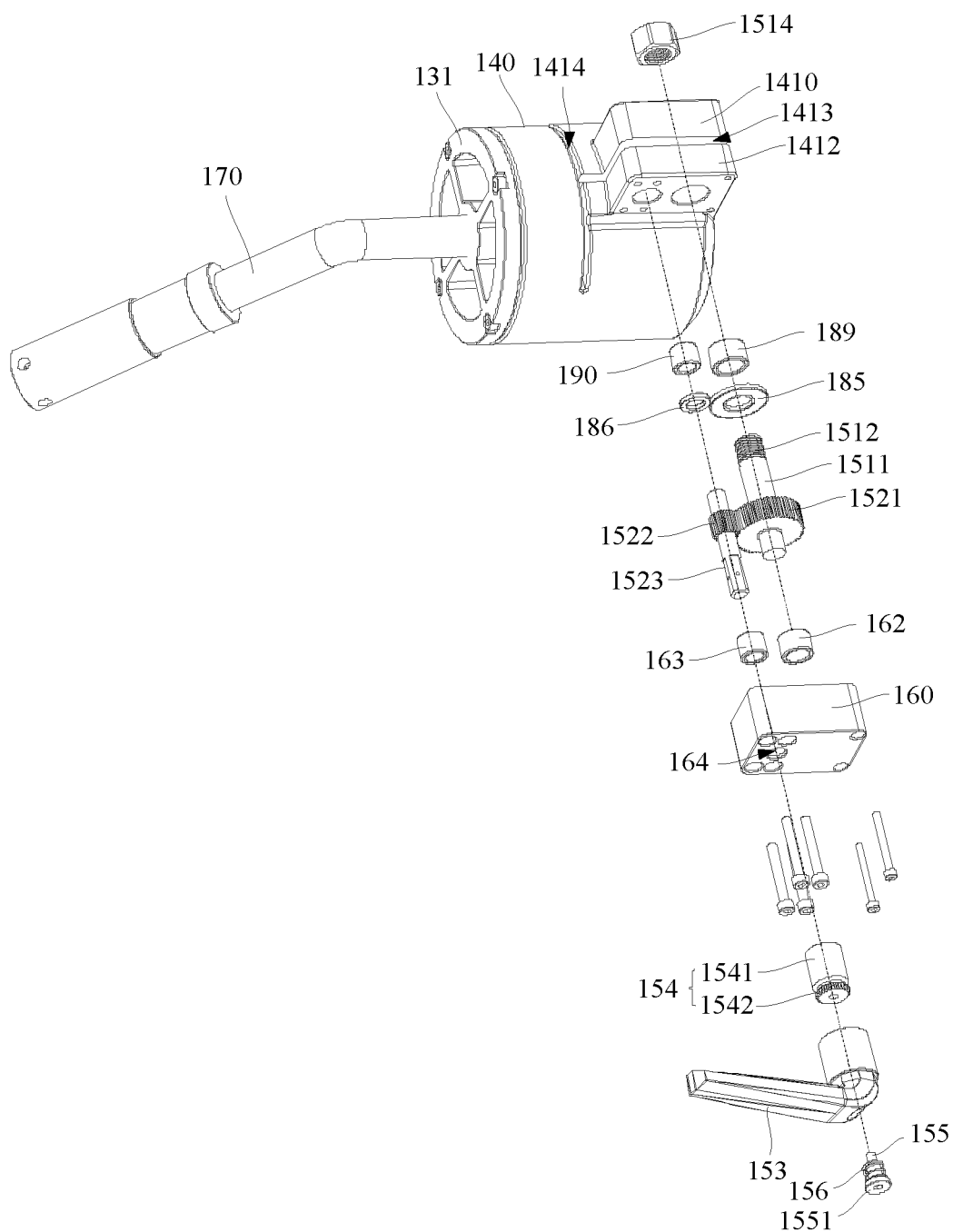
FIG. 7 is a schematic view of an exploded structure of a pan-tilt structure provided by an embodiment of the present application.

Optionally, as shown in FIGS. 5 and 7, the adjustment assembly 151 includes an adjustment rod 1511, and the adjustment rod 1511 is provided with a threaded connection portion 1512 and an abutment portion 1513, and the threaded connection portion 1512 on the adjustment rod 1511 is threadedly connected with the first locking portion 1410, and the abutment portion 1513 abuts on the side of the second locking portion 1412 away from the first locking portion 1410. The transmission assembly 152 is connected with the adjustment rod 1511 to drive the adjustment rod 1511 to rotate.

Since the adjustment rod 1511 is threadedly connected to the first locking portion 1410 through the threaded connection portion 1512, by controlling the rotation of the adjustment rod 1511, the adjustment rod 1511 can be moved relative to the first locking portion 1410 along the length of the adjustment rod 1511, thereby changing the distance between the abutment portion 1513 on the adjustment rod 1511 and the first locking portion 1410.

Since the abutment portion 1513 abuts on the side of the second locking portion 1412 away from the first locking portion 1410, when the driving member 153 drives the adjustment rod 1511 to rotate through the transmission assembly 152 to make the abutment portion 1513 close to the first locking portion 1410, the abutment portion 1513 will push the second locking portion 1412 is close to the first locking portion 1410 to reduce the distance between the first locking portion 1410 and the second locking portion 1412; when the driving member 153 drives the adjustment rod 1511 to rotate in the reverse direction through the transmission assembly 152, and the abutment portion 1513 is moved away from the first locking portion 1410, the push force applied by the abutment portion 1513 to the second locking portion 1412 is reduced, so that the second abutment portion 1513 moves away from the first locking portion 1410 under the action of its own elastic force to increase the distance between the first locking portion 1410 and the second locking portion 1412.

Among them, the adjustment assembly 151 includes a locking nut 1514, the locking nut 1514 is disposed on the first locking portion 1410, and the locking nut 1514 is threadedly connected to the threaded connection portion 1512, so that the first locking portion 1410 is threadedly connected to the threaded connection portion 1512. Specifically, a mounting groove 1411 is provided on the side of the first locking portion 1410 away from the second locking portion 1412, and the locking nut 1514 is mounted in the mounting groove 1411. The shape of cross-section of the locking nut 1514 along the radial direction of the adjustment rod 1511 is non-circular, and the shape of the mounting groove 1411 is adapted to the shape of the locking nut 1514 to restrict the locking nut 1514 from rotating in the mounting groove 1411. In addition, the shape of the cross-section of the locking nut 1514 along the radial direction of the adjustment rod 1511 includes a rectangle, a pentagon, a hexagon, etc., which are not limited herein.

As shown in FIG. 5 and FIG. 7, the transmission assembly 152 includes a first transmission wheel 1521 arranged on the adjustment rod 1511, and a second transmission wheel 1522 connected to the driving member 153, and the second transmission wheel 1522 is drivingly connected to the first transmission wheel 1521. When the driving member 153 drives the second transmission wheel 1522 to rotate, it can drive the first transmission wheel 1521 to rotate, which in turn drives the adjustment rod 1511 to rotate. In addition, the transmission ratio of the second transmission wheel 1522 and the first transmission wheel 1521 is greater than 1, so as to reduce the force required by the driving member 153 to drive the second transmission wheel 1522 to rotate.

In some embodiments, the first transmission wheel 1521 is a first gear, and the second transmission wheel 1522 is a second gear that meshes with the first gear, and the index circle diameter of the first gear is greater than the index circle diameter of the second gear, and the transmission ratio of the second gear to the first gear is greater than 1. Among them, the first gear includes a spur gear, a helical gear, a bevel gear, and an internal gear, etc., which are not limited herein. The second gear includes a spur gear, a helical gear, and a bevel gear, etc. which can mesh with the first gear, which are not limited herein.

In other embodiments, the first transmission wheel 1521 is a worm gear, and the second transmission wheel 1522 is a worm that meshes with the worm gear.

Alternatively, the first transmission wheel 1521 is the first timing pulley, and the second transmission wheel 1522 is the second timing pulley. The first timing pulley is connected to the second timing pulley through a timing belt. The diameter of the first timing pulley is larger than the diameter of the second timing pulley, such that the transmission ratio between the second timing pulley and the first timing is greater than 1.

In addition, the first transmission wheel 1521 is the first sprocket, and the second transmission wheel 1522 is the second sprocket. The first sprocket is connected to the second sprocket by a chain. The diameter of the first sprocket is larger than the diameter of the second sprocket, such that the transmission ratio of the second sprocket and the first sprocket is greater than 1.

Optionally, the second gear is located on the side of the second locking portion 1412 away from the first locking portion 1410. The abutment portion 1513 is located on the side of the second gear facing the second locking portion 1412, so that the structures of the adjustment assembly 151 and the transmission assembly 152 are simpler.

Specifically, the second gear is coaxially connected with the adjustment rod 1511. The second gear is integrated with the adjustment rod 1511. The side of the second gear facing the second locking portion 1412 abuts on the side of the second locking portion 1412 away from the first locking portion 1410. The side of the second gear facing the second locking portion 1412 is the abutment portion 1513.

Among them, a first gasket 185 is further provided between the abutment portion 1513 and the second locking portion 1412 to form a buffer between the abutment portion 1513 and the second locking portion 1412, so as to prevent the abutment portion 1513 or the second locking portion 1412 from appearing to be worn out when the abutment portion 1513 rotates relative to the second locking portion 1412.

In order to facilitate the meshing of the second gear with the first gear, as shown in FIGS. 5 and 7, the second gear is rotatably connected with the second locking portion 1412, and the second gear is located on the side of the second locking portion 1412 away from the first locking portion 1410. Among them, a second gasket 186 is provided between the second gear and the second locking portion 1412 to form a buffer between the second gear and the second locking portion 1412, which effectively prevents the second gear or the second locking portion 1412 from appearing to be worn out when the second gear rotates relative to the second locking portion 1412.

Optionally, a first bearing 189 is provided on the second locking portion 1412, and the first bearing 189 is sleeved on the adjustment rod 1511, so that the adjustment rod 1511 and the second locking portion 1412 are rotationally connected. The first bearing 189 can reduce the friction between the adjustment rod 1511 and the second locking portion 1412, so that the adjustment rod 1511 can rotate more smoothly relative to the second locking portion 1412.

Similarly, a second bearing 190 is provided on the second locking portion 1412, the second transmission wheel 1522 includes a rotating shaft 1523 connected with the second gear, and the second bearing 190 is sleeved on the rotating shaft 1523, so that the second transmission wheel 1522 and the second locking portion 1412 are rotatably connected. The second bearing 190 can reduce the friction between the second gear and the second locking portion 1412, so that the second gear can rotate more smoothly relative to the second locking portion 1412.

Among them, the rotating shaft 1523 is connected to one end of the handle. The user can drive the rotating shaft 1523 to rotate by rotating the handle, and in turns driving the second gear to rotate through the rotation, so that the second gear drives the adjustment rod 1511 to rotate through the first gear, and the operation is very convenient.

As shown in FIG. 5, the pan-tilt structure 130 further includes a protective cover 160, which is provided on the side of the second locking portion 1412 away from the first locking portion 1410, and the protective cover 160 is provided with a receiving cavity 161, the first transmission wheel 1521 and the second transmission wheel 1522 are located in the receiving cavity 161. Therefore, the protective cover 160 can protect the first transmission wheel 1521 and the second transmission wheel 1522, prevent dust and impurities from being adsorbed on the first transmission wheel 1521 and the second transmission wheel 1522, and at the same time, prevent the first transmission wheel 1521 and the second transmission wheel 1522 from being affected and damaged by collision of foreign objects.

Among them, a third bearing 162 is provided on the protective cover 160, and the third bearing 162 is sleeved on the adjustment rod 1511, so that the third bearing 162 and the protective cover 160 are rotatably connected. It is understandable that the protective cover 160 is rotatably connected with the adjustment rod 1511 through the third bearing 162, which can make the mounting of the adjustment rod 1511 more stable and less prone to shaking.

In addition, a fourth bearing 163 is provided on the protective cover 160, and the fourth bearing 163 is sleeved on the rotating shaft 1523, so that the rotating shaft 1523 and the protective cover 160 are rotatably connected, thereby making the mounting of the second transmission wheel 1522 more stable.

Among them, one end of the rotating shaft 1523 passes through the protective cover 160 and is connected to one end of the handle. Specifically, a through hole 164 is provided at a position of the protective cover 160 corresponding to the rotating shaft 1523, and the end of the rotating shaft 1523 away from the second locking portion 1412 passes through the through hole 164 and extends to the surface of the protective cover 160 on the side facing away from the second locking portion 1412. One end of the handle is connected with the end of the rotating shaft 1523 extending to the surface of the protective cover 160.

Optionally, a first mounting hole 1531 is provided on one side of the handle, and an internal gear 1532 is convexly provided on the inner peripheral wall of the first mounting hole 1531, and the internal gear 1532 is sequentially distributed along the circumferential direction of the first mounting hole 1531. A fixing member 154 fixedly connected to the rotating shaft 1523 is mounted in the first mounting hole 1531. The fixing member 154 includes a rotating portion 1541 that is rotatably mounted in the first mounting hole 1531, and an external gear 1542 connected to the rotating portion 1541. The external gear 1542 is sequentially distributed along the circumferential direction of the rotating portion 1541, and the internal gear 1532 and the external gear 1542 are meshed with each other.

When the handle is rotated, the handle can drive the fixing member 154 to rotate through the internal gear 1532 and the external gear 1542 that are meshed with each other, so that the fixing member 154 drives the rotating shaft 1523 to rotate. When the handle is moved a certain distance along the rotating shaft 1523 away from the second locking portion 1412, and the internal gear 1532 and the external gear 1542 are staggered, the handle can be automatically rotated without driving the fixing member 154 to rotate. When the handle is adjusted to a proper angle, the handle can be moved a certain distance along the direction of the rotating shaft 1523 close to the second locking portion 1412, so that the internal gear 1532 and the external gear 1542 are re-meshed, thereby realizing the adjustment of the handle angle.

The cross section of the end of the rotating shaft 1523 away from the second locking portion 1412 is non-circular, and the fixing member 154 is provided with a connection hole 1543 adapted to the rotating shaft 1523, and the end of the rotating shaft 1523 away from the second locking portion 1412 is inserted into the connection hole 1543, so that the fixing member 154 is connected to the rotating shaft 1523, and when the handle drives the fixing member 154 to rotate, the fixing member 154 can drive the rotating shaft 1523 to rotate.

Optionally, a through hole 1533 is provided on the bottom surface of the first mounting hole 1531, a second mounting hole 1534 is provided on the side of the handle away from the first mounting hole 1531, and the through hole 1533 passing through the bottom surface of the second mounting hole 1534 is in communication with the second mounting hole 1534. A limiting member 155 is provided in the second mounting hole 1534, one end of the limiting member 155 passes through the through hole 1533 and is connected to the fixing member 154, and the other end of the limiting member 155 is provided with a limiting portion 1551.

An elastic member 156 is provided in the second mounting hole 1534, and the elastic member 156 is located between the limiting portion 1551 and the bottom surface of the second mounting hole 1534. One end of the elastic member 156 abuts against the bottom surface of the second mounting hole 1534, and the other end of the elastic member 156 abuts against the limiting portion 1551. Among them, the elastic member 156 is sleeved on limiting member 155 such that the mounting of elastic member 156 is more stable. The elastic member 156 includes springs, rubber, etc., which is not limited herein.

The elastic member 156 abuts against the bottom surface of the second mounting hole 1534, and the elastic member 156 applies an elastic force on the handle to keep the handle at the position where the internal gear 1532 meshes with the external gear 1542, so that the handle can stably drive the fixing member 154 to rotate.

Figure 3:
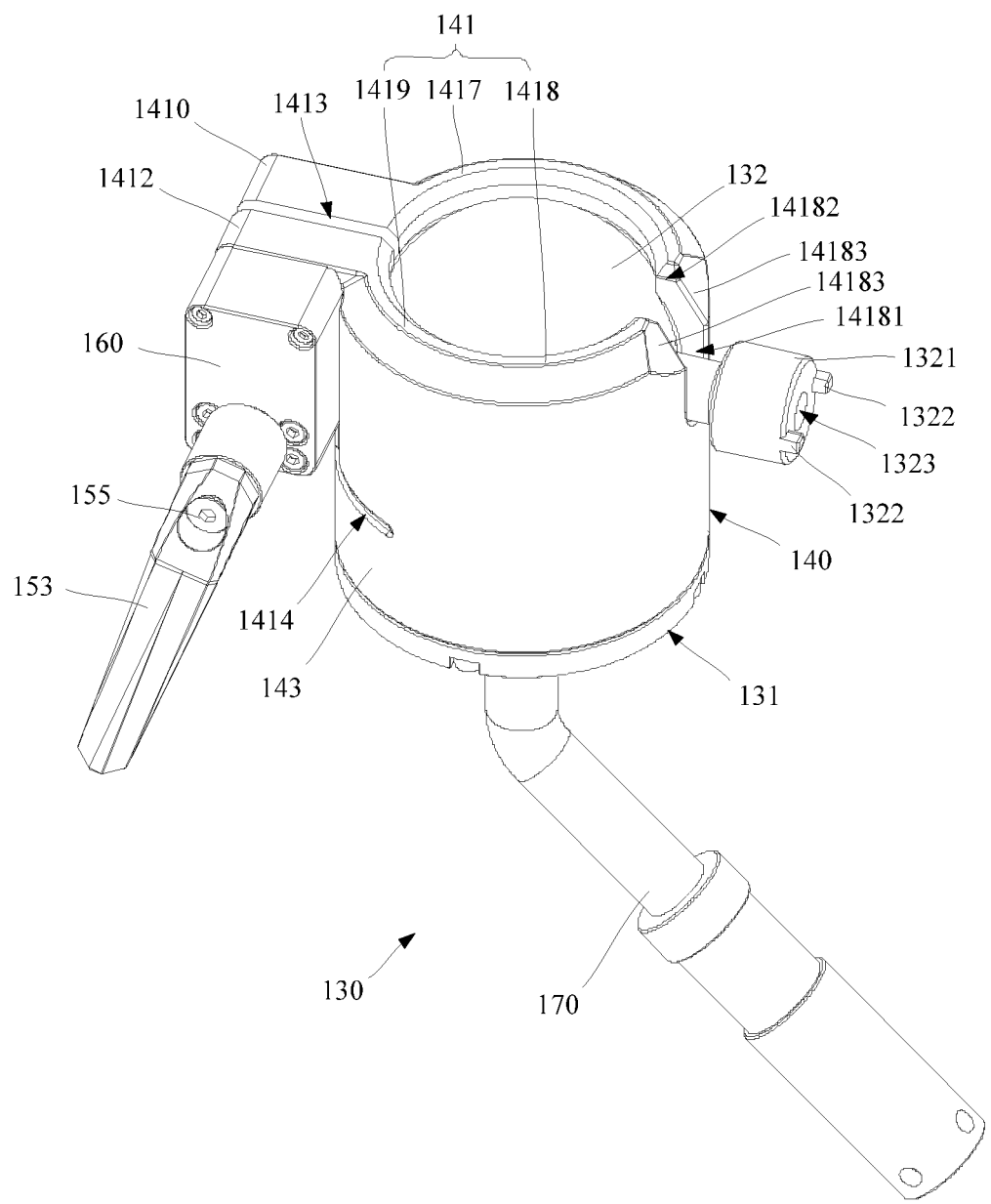
FIG. 3 is a schematic structural view of an embodiment of a pan-tilt structure provided by an embodiment of the present application.
Figure 4:
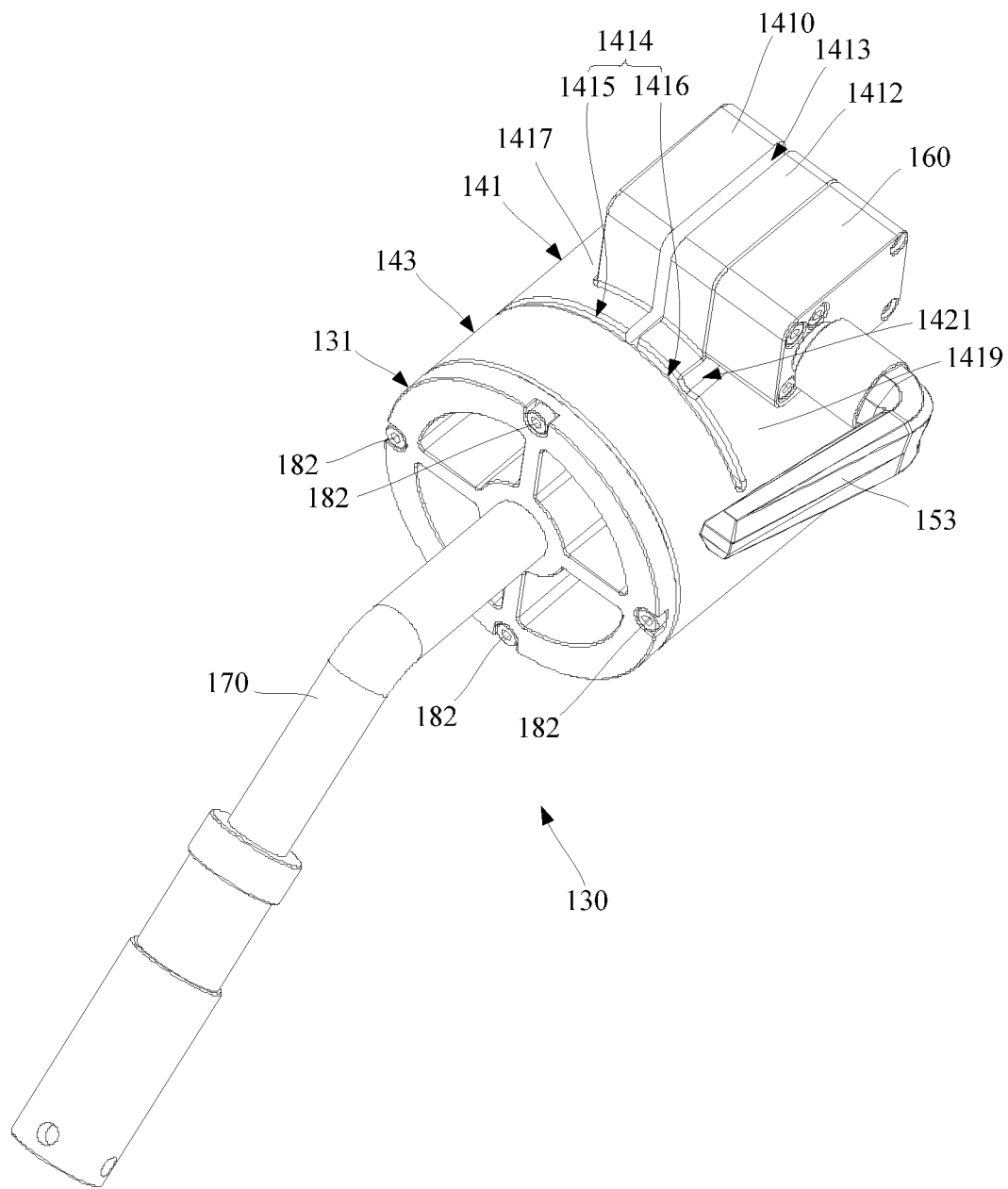
FIG. 4 is another perspective view of the pan-tilt structure in FIG. 3.
Figure 6:
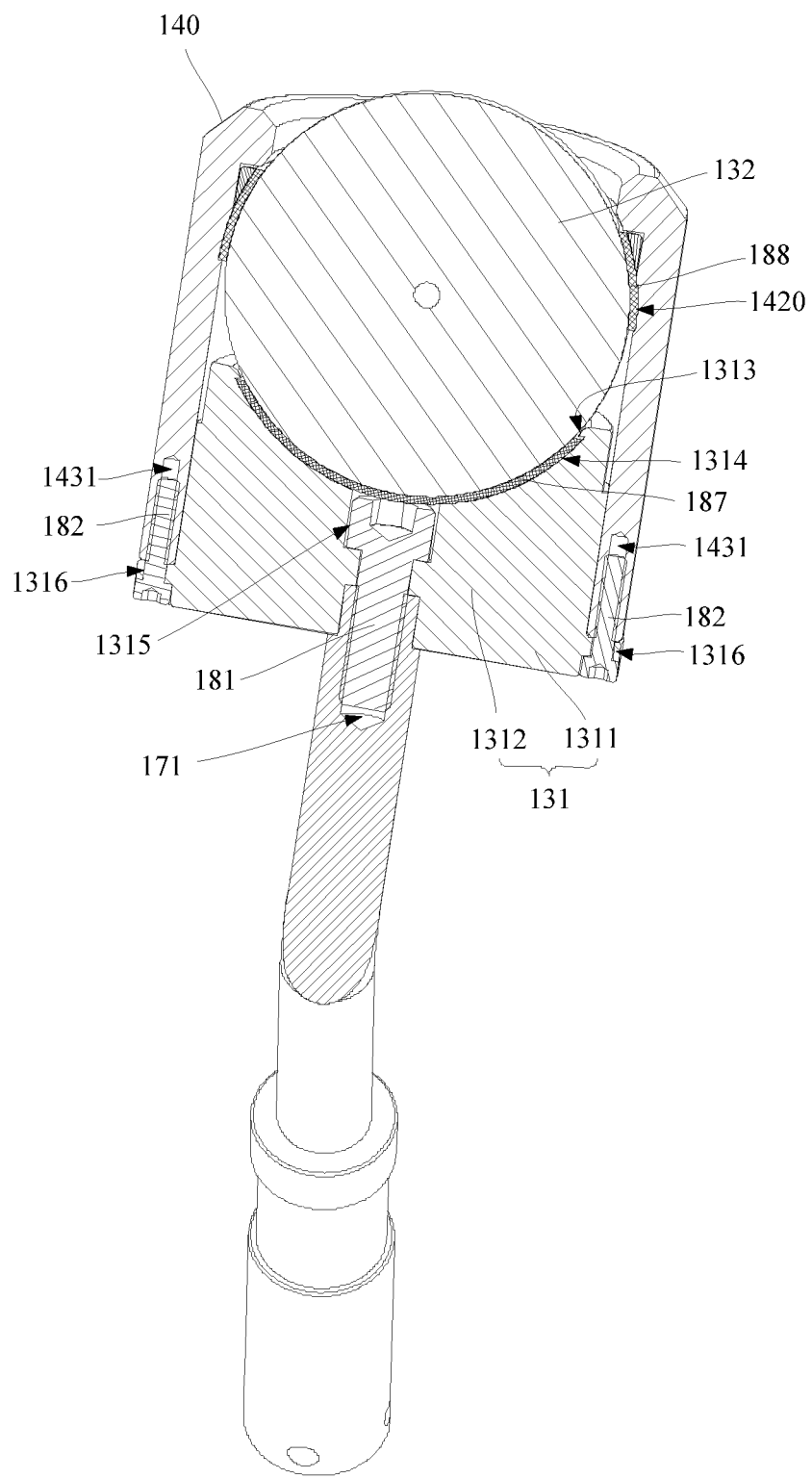
FIG. 6 is a second cross-sectional view of a pan-tilt structure provided by the embodiment of the present application, which is a cross-sectional view along an axial direction of a ball sleeve.

As shown in FIGS. 3, 4, and 6, a deformation gap 1414 is provided between the locking member 141 and the base 131. For example, in space, the deformation gap 1414 may be located between the base 131 and the first and second locking portions, and the deformation gap 1414 is relatively close to the base 131. The deformation gap 1414 extends along the circumferential direction of the locking member 141, and the deformation gap 1414 is connected to the adjustment gap 1413. Therefore, when the locking mechanism 150 adjusts the distance between the first locking portion 1410 and the second locking portion 1412, the portion of the locking member 141 corresponding to the deformation gap 1414 is more likely to deform, thereby adjusting the tightness of the locking member 141.

Among them, the locking member 141 includes the first deformation section 1417, the connection suction 1418, and the second deformation section 1419 that are sequentially connected along the circumferential direction of the locking member 141. The first locking portion 1410 is located at the end of the first deformation section 1417 away from the connection suction 1418, and the second locking portion 1412 is located at the end of the second deformation section 1419 away from the connection suction 1418, and the deformation gaps 1414 are provided between the first deformation section 1417 and the base 131, as well as between the second deformation section 1419 and the base 131. When the locking mechanism 150 adjusts the distance between the first locking portion 1410 and the second locking portion 1412, both the first deformation section 1417 and the second deformation section 1419 of the locking member 141 will be deformed, thereby adjusting the tightness of the locking member 141.

Optionally, the base 131 includes a bottom plate 1311 and a support portion 1312 protruding from the side of the bottom plate 1311, and the support surface 1313 is located on the side of the support portion 1312 away from the bottom plate 1311. The ball sleeve 140 includes a connection ring 143 on the side of the locking member 141 facing the base 131. The connection ring 143 is sleeved on the support portion 1312 such that the connection between the ball sleeve 140 and the base 131 is more stable.

Among them, the connection suction 1418 of the locking member 141 is connected to the connection ring 143, and the deformation gap 1414 is located between the locking member 141 and the connection ring 143. Specifically, the deformation gap 1414 includes a first gap 1415 located between the first deformation section 1417 and the connection ring 143, and a second gap 1416 located between the second deformation section 1419 and the connection ring 143, so that the first deformation section 1417 and the second deformation section 1419 are easy to be deformed to adjust the tightness of the locking member 141.

Optionally, the sum of the arcs of the deformation gap 1414 in the circumferential direction of the locking member 141 is greater than or equal to 120°, so that the locking member 141 is easier to elastically deform under the action of the adjustment assembly 151. In addition, the sum of the arcs of the deformation gap 1414 in the circumferential direction of the locking member 141 is less than or equal to 140°, so as to prevent the elastic deformation of the locking member 141 from being too large and the locking effect of the locking member 141 on the ball 132 is weakened.

As shown in FIG. 3, the connection suction 1418 of the locking member 141 is penetratingly provided with an accommodating groove 14181, which extends along the direction of the locking member 141 away from the connection ring 143, and the accommodating groove 14181 is provided with an opening 14182 at the locking member 141 on one side away from the connection ring 143. Therefore, the accommodating groove 14181 can accommodate the connection rod 1321 on the ball 132, so that the connection rod 1321 has a larger range of adjustment positions and adjustment angles.

Among them, the opening 14182 on the locking member 141 is arranged in a flared shape, so that the connection rod 1321 can enter the opening 14182. In addition, the outer surface of the connection suction 1418 is provided with an escape slope 14183 at the opening 14182, and the escape slope 14183 is used to escape the connection rod 1321.

Figure 8:
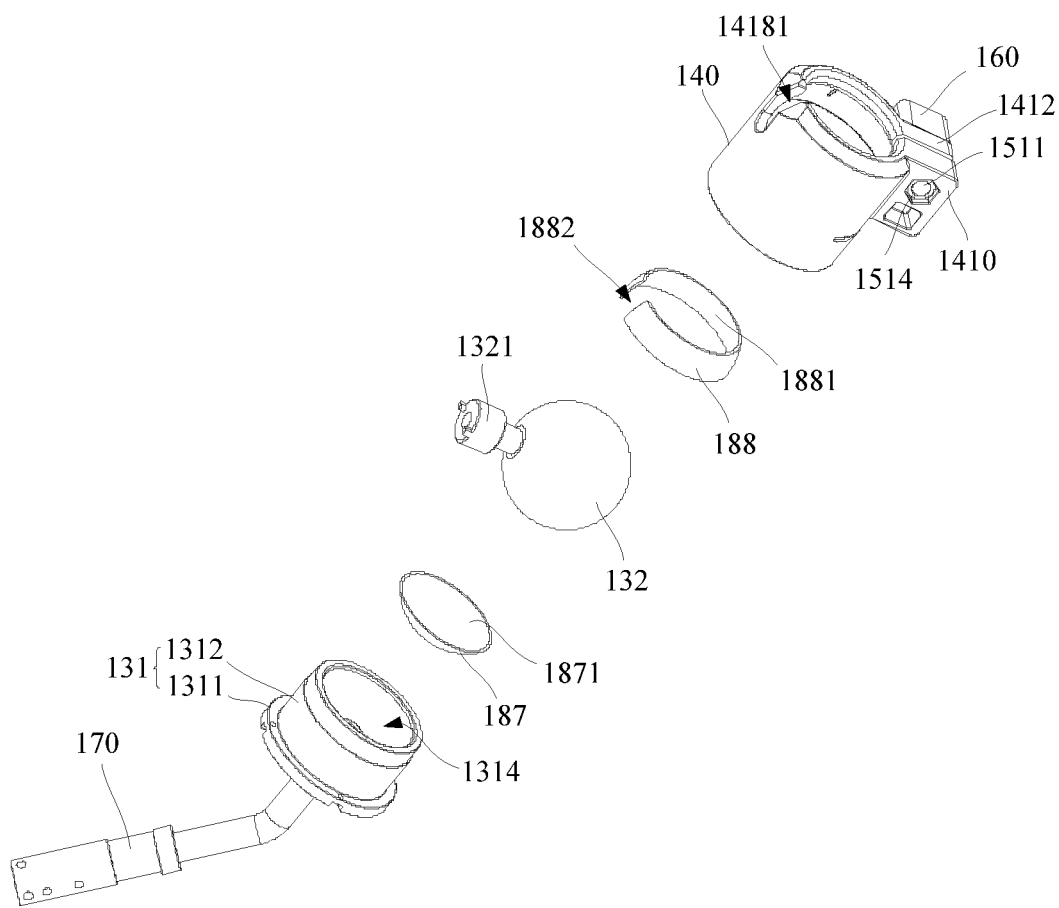
FIG. 8 is another schematic view of an exploded structure of a pan-tilt structure provided by the embodiment of the present application.

As shown in FIGS. 6 and 8, a first friction sheet 187 is provided between the support surface 1313 of base 131 and ball 132 to increase the friction between base 131 and ball 132, thereby improving the locking effect of ball 132. Among them, the first side surface 1871 of the first friction sheet 187 facing the ball 132 is a concave spherical surface. The first side surface 1871 is adapted to the surface of the ball 132 so that the first side surface 1871 of the first friction sheet 187 is fit with the surface of the ball 132. The first friction sheet 187 can be Saigang sheet. The support surface 1313 of the base 131 is provided with a first recess 1314 adapted to the shape of the first friction sheet 187, and the first friction sheet 187 is mounted in the first recess 1314 such that the connection between the first friction sheet 187 and the base 131 is more stable. The diameter of the first side surface 1871 of the first friction sheet 187 is the same as the diameter of the ball 132. The surface of the first friction sheet 187 away from the first side surface 1871 is a convex spherical surface. The center of the sphere of the surface of the first friction sheet 187 away from the first side surface 1871 coincides with the center of the sphere of the first side surface 1871.

In addition, a second friction sheet 188 is provided between the locking member 141 and the ball 132 to increase the friction between the locking member 141 and the ball 132, thereby improving the locking effect of the locking member 141 on the ball 132.

The second friction sheet 188 is arranged around the ball 132 to increase the contact area between the second friction sheet 188 and the surface of the ball 132. The second side surface 1881 of the second friction sheet 188 facing the ball 132 is a concave spherical surface. The second side surface 1881 is fit with the surface of the ball 132 so that the second side surface 1881 of the second friction sheet 188 and the surface of the ball 132 are fit.

Optionally, the second friction sheet 188 is further provided with an escape notch 1882 which corresponds to the position of the accommodating groove 14181 on the ball sleeve 140 to escape the connection rod 1321 on the ball 132.

Among them, the second friction sheet 188 can be Saigang sheet. A second recess 1420 is provided at the position of the locking member 141 corresponding to the second friction sheet 188. The shape of the second recess 1420 matches the shape of the second friction sheet 188. The second friction sheet 188 is mounted in the second recess 1420 such that the connection between the second friction sheet 188 and the locking member 141 is more stable. The second friction sheet 188 is arranged in a ring shape and is disconnected at the escape notch 1882. The diameter of the second side surface 1881 of the second friction sheet 188 is the same as the diameter of the ball 132. The surface of the second friction sheet 188 away from the second side surface 1881 is a convex spherical surface. The center of the sphere of the surface of the second friction sheet 188 away from the second side surface 1881 coincides with the center of the sphere of the second side surface 1881.

As shown in FIG. 5, the first locking portion 1410 and the second locking portion 1412 are convexly provided on the outer surface of the locking member 141 away from the ball 132, so that the adjustment assembly 151 of the locking mechanism 150 is connected to the first locking portion 1410 and the second locking portion 1412 and adjusts the distance between the first locking portion 1410 and the second locking portion 1412.

As shown in FIG. 4, an escape groove 1421 is provided on the outer surface of the locking member 141 close to the edge of the second locking portion 1412. The escape groove 1421 extends along the axial direction of the locking member 141, and a side edge of the protective cover 160 facing the locking member 141 is located in the escape groove 1421, therefore the overall volume of the ball sleeve 140 and the locking mechanism 150 is smaller.

As shown in FIGS. 4 and 6, a support rod 170 is connected to the side of the base 131 away from the ball 132. Specifically, a first fixing hole 171 is provided on the end surface of the support rod 170 close to one end of the base 131, and a second fixing hole 1315 is provided on the base 131. The pan-tilt structure 130 further includes a first fastener 181, which passes through the second fixing hole 1315 from the base 131 away from a side of the support rod 170 and is inserted into the first fixing hole 171 to fix the support rod 170 and the base 131 together. Among them, the first fastener 181 is a screw.

As shown in FIG. 6, the bottom plate 1311 of the base 131 is further provided with a third fixing hole 1316, the connection ring 143 is provided with a fourth fixing hole 1431. The pan-tilt structure 130 further includes a second fastener 182, and the second fastener 182 passes through the third fixing hole 1316 from the base 131 away from a side of the ball sleeve 140 and is inserted into the fourth fixing hole 1431 to fix the bottom plate 1311 of the base 131 and the connection ring 143 of the ball sleeve 140 together. Among them, the second fastener 182 is a screw.

Figure 2:
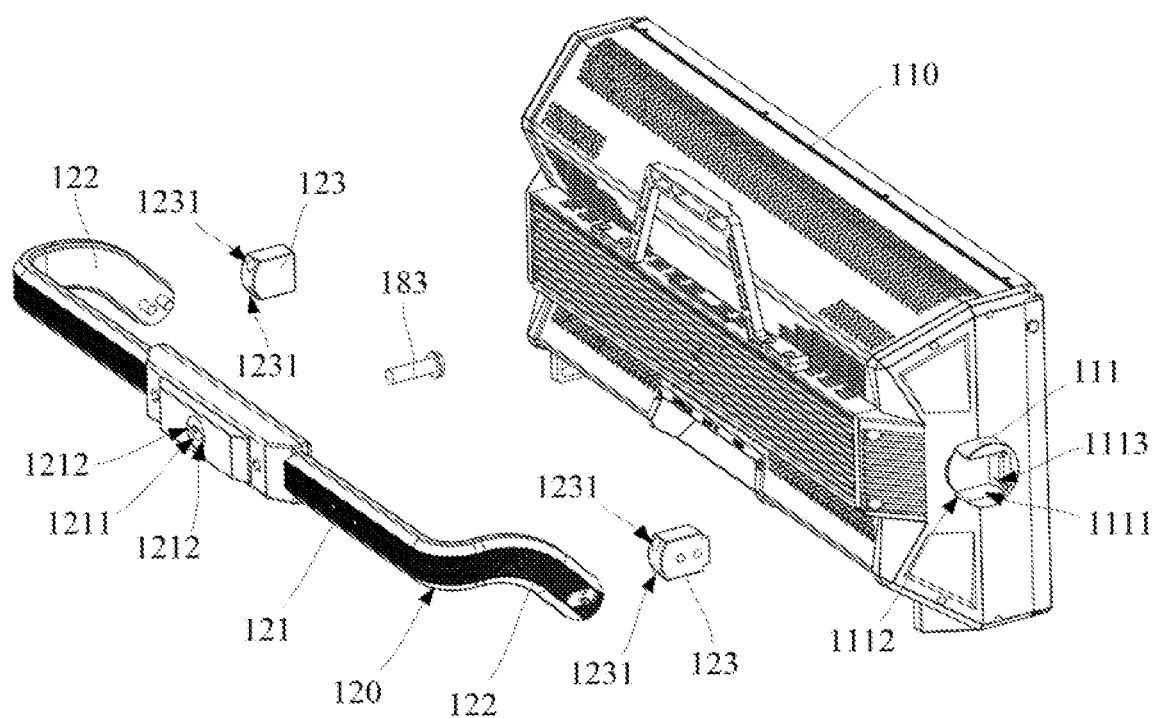
FIG. 2 is a schematic view of an exploded structure of a lamp and a bracket provided by an embodiment of the present application.

As shown in FIGS. 1 and 2, a limiting protrusion 1322 and a fifth fixing hole 1323 are provided on the end of the connection rod 1321 away from the ball 132, and a sixth fixing hole 1211 and a limiting groove 1212 are provided on the bracket 120. The limiting protrusion 1322 on the connection rod 1321 is inserted into the limiting groove 1212 on the bracket 120 so that the positions of the fifth fixing hole 1323 and the sixth fixing hole 1211 correspond to each other.

The lighting device 100 further includes a third fastener 183 that passes through the sixth fixing hole 1211 and is inserted into the fifth fixing hole 1323 to connect the bracket 120 and the connection rod 1321 together. Among them, the third fastener 183 is a screw such that the connection of bracket 120 and connection rod 1321 is more convenient.

Among them, the limiting protrusions 1322 on the connection rod 1321 are provided with two, and the two limiting protrusions 1322 are distributed on opposite sides of the fifth fixing hole 1323. The fifth fixing hole 1323 extends along the length direction of the connection rod 1321 from the end surface of the connection rod 1321 away from an end of the ball 132.

In addition, the bracket 120 includes a first support rod 121 and second support rods 122 connected to both ends of the first support rod 121, and the two second support rods 122 are respectively arranged at an angle with the first support rod 121, and the two second support rods 122 are bent facing a same side of the support rod 121. The connection rod 1321 is connected to a side of the first support rod 121 away from the two second support rods 122. The ends of the two second support rods 122 away from the first support rod 121 are respectively connected to the two sides of the lamp 110 along the length of the first support rod 121, so that the bracket 120 and the lamp 110 are connected.

Optionally, support members 111 are provided on both sides of the lamp 110 along the length direction of the first support rod 121, the support members 111 are rotatably connected with the lamp 110, and the ends of the two second support rods 122 away from the first support rod 121 are respectively connected to the support members 111 on both sides of the lamp 110, so that the bracket 120 and the lamp 110 are rotatably connected.

Connection blocks 123 are provided at ends of the two second support rods 122 away from the first support rod 121, and a connection groove 1111 is provided on the support member 111. The inner sidewall of the connection groove 1111 is provided with a notch 1112, and the connection block 123 slides from the notch 1112 and is mounted into the connection groove 1111. A seventh fixing hole 1231 is provided on the side of the connection block 123 close to the notch 1112, and an eighth fixing hole 1113 is provided on the inner sidewall of the connection groove 1111 away from the notch 1112. The lighting device 100 further includes a fourth fastener (not shown in the figures), the fourth fastener passes through the seventh fixing hole 1231 and is inserted into the eighth fixing hole 1113 to connect the connection block 123 and the support member 111 together. Among them, the fourth fastener is a screw.

Optionally, the connection block 123 and the second support rod 122 are detachably connected. Specifically, the two connection blocks 123 are located between the two second support rods 122, and the connection block 123 and the second support rod 122 are detachably connected together by screws. Of course, the connection block 123 can also be integrated with the second support rod 122.

The embodiment of the present application further provides a lighting device that includes a pan-tilt structure. For the specific structure of the pan-tilt structure, refer to the above-mentioned embodiments. Since the lighting device adopts all the technical solutions of all the above-mentioned embodiments, which has at least the above-mentioned all the beneficial effects brought by the technical solutions of the embodiments will not be repeated herein.

The lighting device 100 includes a lamp 110, a bracket 120, and a pan-tilt structure 130. The bracket 120 is connected to the lamp 110, and the ball 132 of the pan-tilt structure 130 is connected to the bracket 120.

In the above-mentioned embodiments, the description of each embodiment has its own emphasis. For parts that are not described in detail in an embodiment, reference may be made to related descriptions of other embodiments.

The above is a detailed introduction to a pan-tilt structure and a lighting device provided by the embodiments of the present application. Specific examples are used in the present application to illustrate the principles and implementations of the present application. The description of the above embodiments is only used to help understand the applied technical solutions and the main ideas of the present application; those skilled in the art should understand that they can still modify the technical solutions described in the foregoing embodiments, or equivalently replace some of the technical features; and these modifications or replacements do not cause the essence of the corresponding technical solutions to deviate from the scope of the technical solutions of the embodiments of the present application.

What is claimed is:
1. A pan-tilt structure, comprising:
   a base, a side of the base is provided with a support surface;
   a ball, arranged on the support surface;
   a ball sleeve, comprising a locking member connected to the base, wherein the locking member is arranged around the ball, and the locking member is provided with a first locking portion and a second locking portion that are arranged in an extending direction along the locking member, and an adjustment gap is provided between the first locking portion and the second locking portion and configured for disconnecting the locking member; and
   a locking mechanism, comprising an adjustment assembly, a transmission assembly, and a driving member, wherein the adjustment assembly is connected to the first locking portion and the second locking portion, the driving member is connected to the adjustment assembly through the transmission assembly, to drive the adjustment assembly adjusting a distance between the first locking portion and the second locking portion, and a transmission ratio of the transmission assembly is greater than 1,
  wherein a deformation gap is provided between the locking member and the base, the deformation gap is extended along a circumferential direction of the locking member, and deformation gap is in communication with the adjustment gap.

2. The pan-tilt head structure according to claim 1, wherein:
  the adjustment assembly comprises an adjustment rod, and the adjustment rod is provided with a threaded connection portion and an abutment portion, the threaded connection portion is threadedly connected to the first locking portion, and the abutment portion abuts against a side of the second locking portion away from the first locking portion; and
  the transmission assembly comprises a first transmission wheel arranged on the adjustment rod, and a second transmission wheel connected with the driving member; the second transmission wheel is in transmission connection with the first transmission wheel, and a transmission ratio of the second transmission wheel to the first transmission wheel is greater than 1.

3. The pan-tilt head structure according to claim 2, wherein the first transmission wheel is a first gear, the second transmission wheel is a second gear configured to be meshed with the first gear, and an index circle diameter of the first gear is larger than an index circle diameter of the second gear.

4. The pan-tilt structure according to claim 3, wherein:
  the second gear is located on a side of the second locking portion away from the first locking portion; the abutment portion is located on a side of the second gear facing the second locking portion; and a first gasket is further provided between the abutment portion and the second locking portion; and
  the second gear is rotatably connected with the second locking portion; the second gear is located on a side of the second locking portion away from the first locking portion, and a second gasket is provided between the second gear and the second locking portion.

5. The pan-tilt structure according to claim 2, wherein:
  the second locking portion is provided with a first bearing, and the first bearing is sleeved on the adjustment rod such that the adjustment rod is rotatably connected with the second locking portion; the adjustment assembly comprises a locking nut, the locking nut is arranged on the first lock portion, and the locking nut is threadedly connected to the threaded connection portion such that the first lock portion is threadedly connected with the threaded connection portion; and
  the second locking portion is provided with a second bearing, the second transmission wheel comprises a rotating shaft connected with the second gear, and the second bearing is sleeved on the rotating shaft such that the second transmission wheel is rotatably connected with the second locking portion.

6. The pan-tilt structure according to claim 4, wherein:
  the pan-tilt structure further comprises a protective cover; the protective cover is covered at a side of the second locking portion away from the first locking portion, the protective cover is provided with a receiving cavity, the first transmission wheel and the second transmission wheel are located in the receiving cavity;
  the protective cover is provided with a third bearing, and the third bearing is sleeved on the adjustment rod such that the third bearing is rotatably connected with the protective cover;
  the protective cover is provided with a fourth bearing, and the fourth bearing is sleeved on the rotating shaft such that the rotating shaft is rotatably connected with the protective cover; and
  the driving member comprises a handle; an end of the rotating shaft passes through the protective cover and is connected to an end of the handle.

7. The pan-tilt structure according to claim 1, wherein a sum of an arcs of the deformation gap in the circumferential direction of the locking member is greater than or equal to 120°; and the sum of the arcs of the deformation gap in the circumferential direction of the locking member is less than or equal to 140°.

8. The pan-tilt structure according to claim 1, wherein:
  the locking member comprises a first deformable section, a connection section and a second deformation section connected in sequence along the circumferential direction of the locking member, the first locking portion is located at an end of the first deformation section away from the connection section, and the second locking portion is located at an end of the second deformation section away from the connection section; and
  the base comprises a bottom plate, and a support portion protruding from a side surface of the bottom plate, and the support surface is located at the support portion away from the bottom plate; the ball sleeve comprises a connection ring located on a side of the locking member facing the base, and the connection ring is sleeved on the supporting portion; the connection section is connected to the connection ring, and the deformation gap comprises a first gap located between the first deforming section and the connection ring between, and a second gap located between the second deformation section and the connection ring.

9. The pan-tilt structure according to claim 8, wherein a connection rod is connected to the ball, the connection suction is penetratingly provided with an accommodating groove, the accommodating groove extends along the locking member in a direction away from the connection ring, and the accommodating groove is formed with an opening on a side of the locking member away from the connection ring; the opening is arranged in a flared shape; an outer surface of the connection section is provided with an escape slope at the opening.

10. The pan-tilt structure according to claim 1, wherein a first friction sheet is provided between the support surface and the ball, and a first side surface of the first friction sheet facing the ball is provided with a concave spherical surface configured for fitting with a surface of the ball; a second friction sheet is provided between the locking member and the ball, the second friction sheet is arranged around the ball, and a second side surface of the second friction sheet facing the ball is provided with a concave spherical surface configured for fitting with a surface of the ball.

11. The pan-tilt structure according to claim 1, wherein the first locking portion and the second locking portion are convexly provided on an outer surface of the locking member away from an outer surface of the ball; an outer surface of the locking member close to an edge of the second locking portion is provided with an escape groove, and the escape groove extends along an axial direction of the locking member, and a side edge of the protective cover facing the locking member is located in the escape groove.

12. The pan-tilt structure according to claim 1, wherein:
the transmission ratio of the transmission assembly is greater than or equal to 1.5; and
the transmission ratio of the transmission assembly is less than or equal to 5.

13. A lighting device, comprising:
a lamp;
a bracket, connected to the lamp;
a pan-tilt structure, the ball of the pan-tilt structure is connected with the bracket;
wherein the pan-tilt structure comprises:
  a base, a side of the base is provided with a support surface;
  a ball, arranged on the support surface;
  a ball sleeve, comprising a locking member connected to the base, wherein the locking member is arranged around the ball, and the locking member is provided with a first locking portion and a second locking portion that are arranged in an extending direction along the locking member, and an adjustment gap is provided between the first locking portion and the second locking portion and configured for disconnecting the locking member; and
  a locking mechanism, comprising an adjustment assembly, a transmission assembly, and a driving member; wherein the adjustment assembly is connected to the first locking portion and the second locking portion, the driving member is connected to the adjustment assembly through the transmission assembly, to drive the adjustment assembly adjusting a distance between the first locking portion and the second locking portion, and a transmission ratio of the transmission assembly is greater than 1,
  wherein a deformation gap is provided between the locking member and the base, the deformation gap is extended along a circumferential direction of the locking member, and deformation gap is in communication with the adjustment gap.

14. A pan-tilt structure, comprising:
a base, a side of the base is provided with a support surface;
a ball, arranged on the support surface;
a ball sleeve, comprising a locking member connected to the base, wherein the locking member is arranged around the ball, and the locking member is provided with a first locking portion and a second locking portion that are arranged in an extending direction along the locking member, and an adjustment gap is provided between the first locking portion and the second locking portion and configured for disconnecting the locking member; and
a locking mechanism, comprising an adjustment assembly, a transmission assembly, and a driving member; wherein the adjustment assembly is connected to the first locking portion and the second locking portion, the driving member is connected to the adjustment assembly through the transmission assembly, to drive the adjustment assembly adjusting a distance between the first locking portion and the second locking portion, and a transmission ratio of the transmission assembly is greater than 1,
wherein:
  the adjustment assembly comprises an adjustment rod, and the adjustment rod is provided with a threaded connection portion and an abutment portion, the threaded connection portion is threadedly connected to the first locking portion, and the abutment portion abuts against a side of the second locking portion away from the first locking portion; and
  the transmission assembly comprises a first transmission wheel arranged on the adjustment rod, and a second transmission wheel connected with the driving member; the second transmission wheel is in transmission connection with the first transmission wheel, and a transmission ratio of the second transmission wheel to the first transmission wheel is greater than 1.

15. The pan-tilt head structure according to claim 14, wherein the first transmission wheel is a first gear, the second transmission wheel is a second gear configured to be meshed with the first gear, and an index circle diameter of the first gear is larger than an index circle diameter of the second gear.

16. The pan-tilt structure according to claim 15, wherein:
the second gear is located on a side of the second locking portion away from the first locking portion; the abutment portion is located on a side of the second gear facing the second locking portion; and a first gasket is further provided between the abutment portion and the second locking portion; and
the second gear is rotatably connected with the second locking portion; the second gear is located on a side of the second locking portion away from the first locking portion, and a second gasket is provided between the second gear and the second locking portion.

17. The pan-tilt structure according to claim 14, wherein:
the second locking portion is provided with a first bearing, and the first bearing is sleeved on the adjustment rod such that the adjustment rod is rotatably connected with the second locking portion; the adjustment assembly comprises a locking nut, the locking nut is arranged on the first lock portion, and the locking nut is threadedly connected to the threaded connection portion such that the first lock portion is threadedly connected with the threaded connection portion; and
the second locking portion is provided with a second bearing, the second transmission wheel comprises a rotating shaft connected with the second gear, and the second bearing is sleeved on the rotating shaft such that the second transmission wheel is rotatably connected with the second locking portion.

18. The pan-tilt structure according to claim 16, wherein:
the pan-tilt structure further comprises a protective cover; the protective cover is covered at a side of the second locking portion away from the first locking portion, the protective cover is provided with a receiving cavity, the first transmission wheel and the second transmission wheel are located in the receiving cavity;
the protective cover is provided with a third bearing, and the third bearing is sleeved on the adjustment rod such that the third bearing is rotatably connected with the protective cover;
the protective cover is provided with a fourth bearing, and the fourth bearing is sleeved on the rotating shaft such that the rotating shaft is rotatably connected with the protective cover; and
the driving member comprises a handle; an end of the rotating shaft passes through the protective cover and is connected to an end of the handle.

19. The pan-tilt structure according to claim 14, wherein:
the transmission ratio of the transmission assembly is greater than or equal to 1.5; and
the transmission ratio of the transmission assembly is less than or equal to 5.

20. The pan-tilt structure according to claim 14, wherein either:
- a first friction sheet is provided between the support surface and the ball, and a first side surface of the first friction sheet facing the ball is provided with a concave spherical surface configured for fitting with a surface of the ball; a second friction sheet is provided between the locking member and the ball, the second friction sheet is arranged around the ball, and a second side surface of the second friction sheet facing the ball is provided with a concave spherical surface configured for fitting with a surface of the ball; or
- the first locking portion and the second locking portion are convexly provided on an outer surface of the locking member away from an outer surface of the ball; an outer surface of the locking member close to an edge of the second locking portion is provided with an escape groove, and the escape groove extends along an axial direction of the locking member, and a side edge of the protective cover facing the locking member is located in the escape groove.

* * * * *